United States Patent [19]

Long

[11] Patent Number: 5,401,161
[45] Date of Patent: Mar. 28, 1995

[54] INJECTION MOLDING VALVE

[76] Inventor: Michael C. Long, 271 S. Clifton Ave., Elgin, Ill. 60123

[21] Appl. No.: 85,469

[22] Filed: Jun. 30, 1993

Related U.S. Application Data

[63] Continuation of Ser. No. 715,409, Jun. 14, 1991, abandoned.

[51] Int. Cl.⁶ .............................................. B29C 45/52
[52] U.S. Cl. ..................................... 425/563; 425/564; 425/DIG. 224
[58] Field of Search .......................... 264/328.1, 328.19; 425/559, 562, 563, 564, DIG. 224

[56] References Cited

U.S. PATENT DOCUMENTS 4,643,665  2/1987  Zeiger .................. 425/DIG. 224
5,044,926  9/1991  Dinerman et al. ................... 425/563

FOREIGN PATENT DOCUMENTS 866929  5/1961  United Kingdom ................. 425/562

OTHER PUBLICATIONS

"Datum Tool Injection Head" dist. by CAC Tool, Witchita, KS.

"Mallard Non-Return Valve" Zeiger Indust., Canton, OH.
"4 Piece Ring Valve" EMI Corp., Jackson Center, OH.
"Chief II Mixing Screw" CAC Tool, Wichita, KS.
"Barrier Screw" CAC Tool, Witchita, KS.
"SPI Machinery Component Third Draft Proposal" Fall, 1989.

*Primary Examiner*—Jill L. Heitbrink
*Attorney, Agent, or Firm*—Keck, Mahin & Cate

[57] ABSTRACT

An injection molding ring valve assembly, having a concentrically disposed axially translatable center valve body member which when in a first axial position allows mass flow through the valve assembly and a separate front valve seat member in the shape of a torus in cooperation with a check ring, thereby providing smooth and unrestricted annular flow through the valve assembly during the priming process of the injection sequence. The check ring, formed from a cylindrical outer ring disposed about the center valve body member, sealingly engages an outer valve seat portion of the torus or front valve seat member. The torus further includes a center hub portion and at least one radially projecting web portion connecting the hub portion and the annular outer portion, resulting in one or more substantially axial semi-annular openings for the smooth and unrestricted passage of molding material.

8 Claims, 2 Drawing Sheets

INJECTION MOLDING VALVE

This application is a continuation, of application Ser. No. 07/715,409, filed Jun. 14, 1991, now abandoned.

BACKGROUND OF THE INVENTION

1. Field of the Invention

The present invention relates to screw-driven injection molding devices employed in the fabrication of molded items and, more particularly, to an improved injection molding ring valve assembly which utilizes a replaceable torus-shaped front seal member providing unrestricted annular mass flow during the priming phase of the injection sequence.

2. Description of the Prior Art

A variety of molding devices providing a finished molded item have been devised, including screw-driven injection molding devices. These devices typically operate by the introduction of solid, powdered material (i.e., powdered plastic) into a heated barrel wherein the material is melted. The material, while the melting process is occurring, is transported through the heated barrel by a rotating helical screw until the material reaches the injection nozzle. The pressure generated by the rotating screw further loosely packs the injector nozzle, mold runners, and mold cavities with the appropriate amount of material for the particular configuration to be molded.

The valve assembly components and the screw are then rapidly moved toward the nozzle end of the injector device. The result is extreme pressurization (often exceeding 20,000 psi) of the mold cavity ensuring the elimination of voids and stress concentrations in the finished molded item. During this phase of the injection sequence, simultaneous prevention of reverse mass flow under such high pressure back through the nozzle and into the barrel is necessary.

Preventing this reverse mass flow, nozzles are generally provided with valve assemblies that automatically interrupt mass flow through the nozzle. Commonly, ring valves having three separate components, including a valve body having an integral front valve seat, a check ring (or valve closure member) and a rear valve seat member, are used in such applications. Although generally useful for the purposes for which they are used, these three-piece ring valves do have a significant shortcoming.

This shortcoming is wear at the interface between the integral front valve seat portion of the valve body providing the seal between the valve body and the check ring. During the priming phase of the injection sequence, while the screw is rotating and transporting material toward the mold, the check ring is forced by the pressure within the barrel into abutting relation with the valve body front valve seat. This combination of rotation and pressure also imparts rotational motion to the check ring. However, as the valve body is integrally coupled with the screw mechanism, and the check ring commonly rotates at a different relative angular speed, friction and concommenent wear is the usual result. As the abutting surfaces at this interface wear, it may become necessary to replace not only the check ring, but also the valve body. The result is an expensive repair.

Attempts toward a solution of this shortcoming have included the use of a separate front valve seat member which cooperates with the valve body directing mass flow around the perimeter of the valve body into the nozzle region and also acts as a bearing surface for the valve body/check ring interface. These separate front valve seat members of previous designs where typically simple collars which mated against the valve body on one side and the check ring on the other. Mass flow was provided by machining flutes or radial cut-outs about the outer circumference of the front seal member. Thus, if wear occurred, replacement of only the less expensive front valve seat member or the check ring was necessary. The useful life of the far more expensive valve body was accordingly extended.

Unfortunately, the use of a separate front valve seat member also created its own unique set of shortcomings, including restricted mass flow through the valve assembly and the nozzle, higher unit pressures which causing faster wear at the front valve seat member/check ring interface from voids created by the flutes or radial cut-outs, uneven heating of the molding material by the front valve seat member, and the difficulty of complete cleaning caused by the crevices created by the flutes or radial cut-outs.

The rough and abrupt flow transitions present in fluted or radially cut-out front valve seat members form undesirable pressure heads that retard the necessary mass flow rates. In terms of injection device productivity, lower mass flow rates can substantially increase the injection sequence cycle time—indeed, with some fluted or radially cut-out configurations, the cycle time can be increased by more than 80%. These abrupt transitions also set up high shear stresses in plastics that can result in a lower strength of the finished molded item.

Further, the higher unit pressures existing on the remaining material forming the smaller front valve seat bearing surface accelerate valve seat wear. Moreover, the abrupt transition from the fluted or radially cut-out voids to the portions of the front valve seat where material was retained to provide a front valve seat, often at a sharp edge, causes broaching which further accelerates wear and also generates uneven "hot spots" on the front valve seat member which in turn causes uneven heating of the molding material just prior to and during the injection phase of the injection sequence.

Also, the configuration of the front valve seat members of the prior art promotes the accumulation of deposits of the melted material, which forms "chilled" regions in the material as injected into the mold and causes corrosion of the valve assembly components, with less than desirable results. This configuration also interferes with the proper cleaning of the components and the elimination of these deposits.

The improved injection molding valve of the present invention provides a new approach in reducing wear through the use of a separate front valve seat member, while at the same time allowing unrestricted annular mass flow through the valve assembly. In the present invention, the front valve seat member is configured in the shape of a torus. The torus is provided with a hub portion for concentric mounting on the shaft of the valve body, an annular outer valve seat portion for sealing engagement with the check ring and radially projecting streamlined web portions which connect the hub portion with the annular outer valve seat portion. The result is a semi-annular opening allowing unrestricted annular mass flow through the valve assembly and a continuous valve seat surface, without the discontinuities and shortcomings of flutes or radial cut-outs.

OBJECTS OF THE INVENTION

Accordingly, it is an object of this invention to provide an injection molding valve assembly that provides unrestricted annular mass flow of molding material through the injector nozzle while avoiding unnecessary wear on the valve body.

It is a specific object of this invention to provide an injection molding valve assembly with a separate sacrificial front valve seat member that does not retard the mass flow of molding material through the valve assembly and thereby improves the injection device productivity.

It is a further object of this invention to provide an injection molding valve assembly with a separate front valve seat member that reduces the accumulation of deposits on the valve assembly.

It is also an object of this invention to provide an injection molding valve assembly with a separate front valve seat member that reduces the chilling of the material before the material is injected into the mold.

It is another object of this invention to provide an injection molding valve assembly with a separate front valve seat member that reduces unit stresses and resulting wear by offering a continuous annular bearing surface to the check ring of the valve assembly.

It is still another object of this invention to provide an injection molding valve assembly with a separate front valve seat member which maintains a uniform wear pattern throughout the useful life of the front valve seat member.

It is yet another object of this invention to provide an injection molding valve assembly with a separate front valve seat member that is economical and relatively easy to fabricate and machine.

It is a still further object of this invention to provide an injection molding valve assembly that is easy to properly assemble, clean and maintain.

Other objects, advantages, and features of the present invention will become apparent upon reading the following detailed description and appended claims, and upon reference to the accompanying drawings.

SUMMARY OF THE INVENTION

In accordance with this invention, an injection molding ring valve assembly has several interacting concentric members, including an axially translatable center valve body member having a first axial position allowing mass flow through the valve assembly and a second axial position allowing the development of injection pressures within the valve assembly. The valve is provided with a separate front valve seat member, which, in cooperation with a check ring, provides smooth and unrestricted annular flow through the valve assembly during the priming process. A rear valve seat member is also provided which, also in cooperation with the check ring, prevents reverse mass flow during the injection process.

The check ring is formed from a cylindrical outer ring disposed about the center valve body member. As the injector screw and the center valve body member are forced toward the injector nozzle during the injection process, the rear valve seat is forced against one end of the check ring. As pressures build in the nozzle assembly, the rear valve seat is further forced against the check ring, whereby the sealing engagement of the rear valve seat member with the check ring is enhanced.

During the priming stage, the screw and the center valve body member are withdrawn from the nozzle portion of the valve assembly and the front valve seat member, in the shape of a torus, is drawn against the opposite end of the check ring. The resulting seal is maintained and enhanced by the pressure of the molding material being introduced into the nozzle region. The torus forming the front valve seat member includes a center hub portion, an annular outer valve seat portion for sealing engagement with the check ring and at least one radially projecting streamlined web portion connecting the hub portion and the annular outer portion, resulting in one or more semi-annular substantially axial openings for the smooth and unrestricted passage of molding material.

BRIEF DESCRIPTION OF THE DRAWINGS

For a more complete understanding of this invention, one should refer to the embodiment illustrated in greater detail in the accompanying drawings and described below by way of examples of the invention.

In the drawings.

Figure 1:
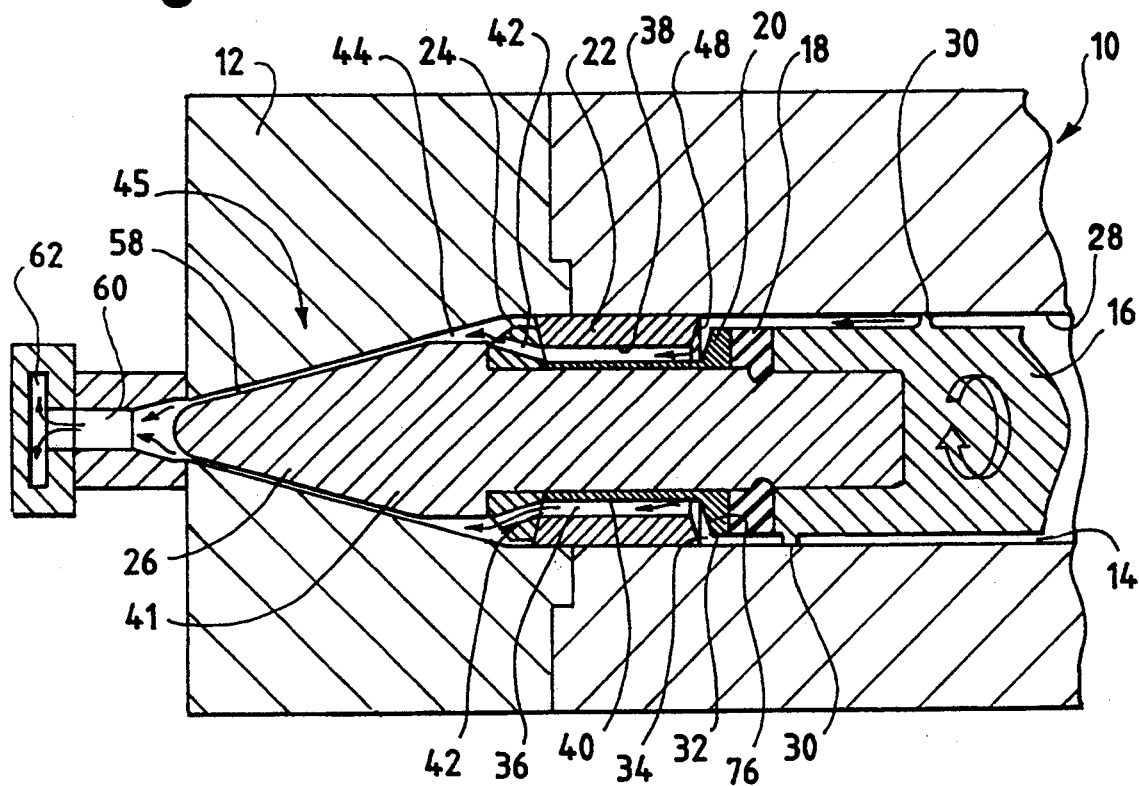
FIG. 1 is a cross-sectional view of the injector valve assembly according to the present invention, showing the center valve body member and screw in the priming position.

It should be understood that the drawings are not necessarily to exact scale and that certain aspects of the embodiments are illustrated by graphic symbols, schematic representations and fragmentary views. It should also be understood that when referring to physical relationships of components by terms such as "upper", "lower", "upward", "downward" "vertical" "horizontal" "left" "right" or the like, such terms have reference solely to the orientation depicted in the drawings. Actual embodiments or installations thereof may differ.

While much mechanical detail, including other plan and section views of the particular embodiment depicted have been omitted, such detail is not per se part of the present invention and is considered well within the comprehension of those skilled in the art in the light of the present disclosure. The resulting simplified presentation is believed to be more readable and informative and readily understandable by those skilled in the art. It should also be understood, of course, that the invention is not limited to the particular embodiment illustrated.

DETAILED DESCRIPTION OF THE PREFERRED EMBODIMENTS

Referring to the figures, wherein like reference characters designate like or corresponding parts throughout the views, FIG. 1 illustrates the overall configuration and function of the preferred embodiment of the injection valve assembly according to the present invention. The valve assembly 10 shown in FIG. 1 may be seen in the priming position within the valve assembly housing 12. The priming position is assumed by the valve assembly 10 during the priming phase of the injection sequence.

Within the housing 12 is a center cylindrical cavity 14 wherein the valve assembly 10 components are disposed. These components include the screw member 16, a spacer 18, a rear valve seat member 20, a reversible check ring 22, a front valve seat member or torus 24, and a center valve body member 26. The center valve body member 26, as shown in FIG. 1, is threaded into the distal end of the screw member 16 and is thereby fixedly coupled thereto.

Figure 3:
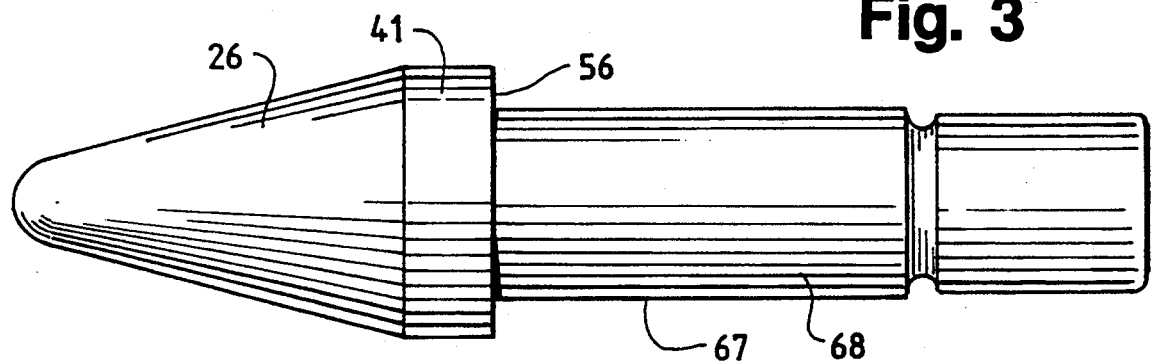
FIG. 3 is a plan view of the center valve body member according to the present invention.
Figure 4A:
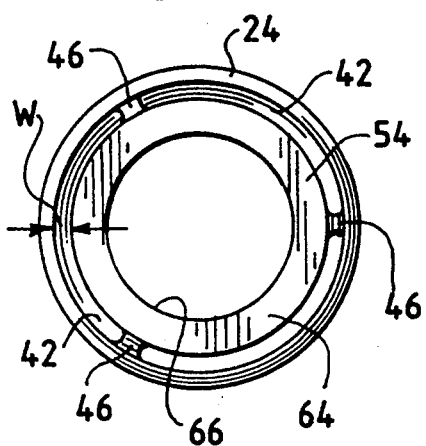
FIG. 4a is a frontal plan view of the torus forming the front valve seat member, showing the semi-annular opening through which melted material flows into the nozzle, according to the present invention.
Figure 4B:
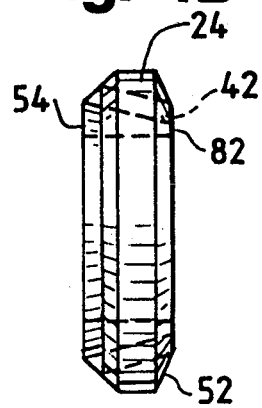
FIG. 4b is a side plan view of the torus forming the front valve seat member according to the present invention.
Figure 4C:
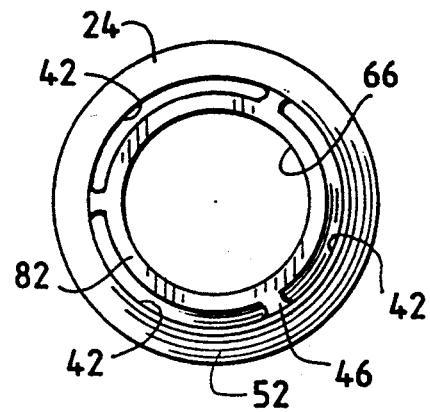
FIG. 4c is a rear plan view of the torus forming the front valve seat member, showing the semi-annular opening into which melted material flows from the valve assembly, according to the present invention.
Figure 5:
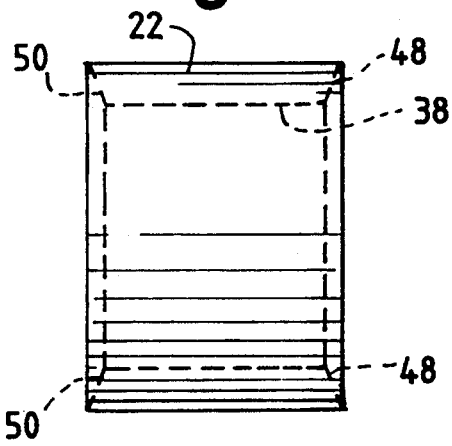
FIG. 5 is a plan view of the check ring according to the present invention.
Figure 6:
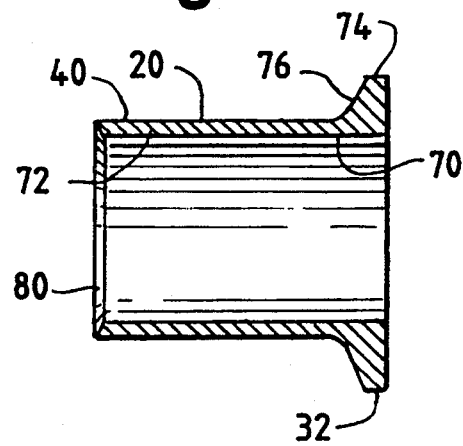
FIG. 6 is a plan view of the rear valve seat member according to the present invention.

The rear valve seat member 20, best seen in Figure 6, is preferably machined from D2 tool steel and may be upgraded for glass-filled or corrosive applications to CPM 10V. The check ring 22, shown in FIG. 5, is preferably machined from A2 tool steel and can be upgraded if desired to CPM 9V. The front valve seat member or torus 24, shown in FIG. 4a–4c, is also preferably machined from D2 tool steel, which also can be upgraded to CPM 10V. Finally, the center valve body member 26, shown in FIG. 3, is preferably machined from 440C stainless steel for all applications.

The molding material, after being melted within the heated barrel 28 defining the center cylindrical cavity 14, is driven toward the left by the rotation of the screw member 16 and the camming action of the helical screw threads 30. As the melted molding material is driven forward, it is caused to flow over the spacer 18 and the outer circumferential face 32 of the rear valve seat member 20. Due to the relative positions of the rear valve seat member 20 and the check ring 22, an annular orifice 34 is created therebetween. The melted molding material flows through the orifice 34 and into an annular valve chamber 36 defined by the inner circumferential surface 38 of the check ring 22 and the outer circumferential surface 40 of a sleeve portion 72 of the rear seat member 20, as best seen in FIGS. 5 and 6.

After the melted molding material is forced through the valve chamber 36, it passes through one or more semi-annular substantially axially-oriented orifices 42 formed in the separate front valve seat member 24. The semi-annular orifice 42, an important aspect of the present invention, is inclined slightly to allow smooth and uninterrupted mass flow over the head 41 of the center valve body member 26 from the inner annular valve chamber 36 to the nozzle chamber 44 formed at the distal end of the cylindrical chamber 14 at the nozzle region 45.

As can be seen in FIG. 4, the semi-annular orifices 42 are formed by machining one or more substantially axial semi-annular slots through the front valve seat member 24, leaving streamlined webs 46 connecting the front valve seat portion to a hub portion 64. Although three such orifices 42 and webs 46 are herein shown, more or less may be used depending on the overall size and strength requirements of the application. The important consideration in determining the orifice width W and the number of webs 46 is the elimination of abrupt mass flow patterns through the front valve seat member for unrestricted annular mass flow through the valve assembly. Accordingly, it is preferred that the width W of the orifice 42 be at least equal to the radial gap, within the inner annular valve chamber 36, formed between the inner circumferential surface 38 of the check ring 22 and the outer peripheral surface 40 of the rear valve seat member sleeve 72. The number and size of the webs 46 should be kept as small as possible and their location should be symmetrical about the circumference of the hub portion 64 eliminating flow restriction within the valve assembly 10. The shape of the webs 36 are preferably streamlined in relation to the direction of molding material flow to reduce the drag coefficient to the maximum extent possible.

Again referring to FIG. 1, it may be seen that the front valve seat member 24 is in abutting relation with both the check ring 22 and the center valve body member 26. The interface of the front valve seat member 24 and the check ring 22 results from the rightward position of the valve assembly 10 and the screw member 16 in conjunction with the hydraulic pressure within the valve chamber 36 and the cylindrical chamber 14 acting on a first annular end face 48 of the check ring 22, which forces a second annular end face 50 located at the opposite end of the check ring 22 against the front valve seat 52 of the front valve seat member 24. These features may be best seen in FIGS. 4 and 5. The result is a tight seal which prevents mass flow through the valve assembly 10 during the priming phase except through the semi-annular orifices 42, which as noted above are configured to provide smooth and unrestricted annular mass flow. Note that this pressure also forces a bearing surface 54 of a hub portion 64 of the front valve seat member 24 against a bearing surface 56 of the center valve body member 26.

After the material enters the annular nozzle chamber 44, it is further directed through the tapered annular nozzle passage 58 into the runners 60 and the mold cavity 62. The position of the valve assembly 10 as shown in FIG. 1 is maintained until the appropriate amount of material for the particular mold configuration is obtained.

Figure 2:
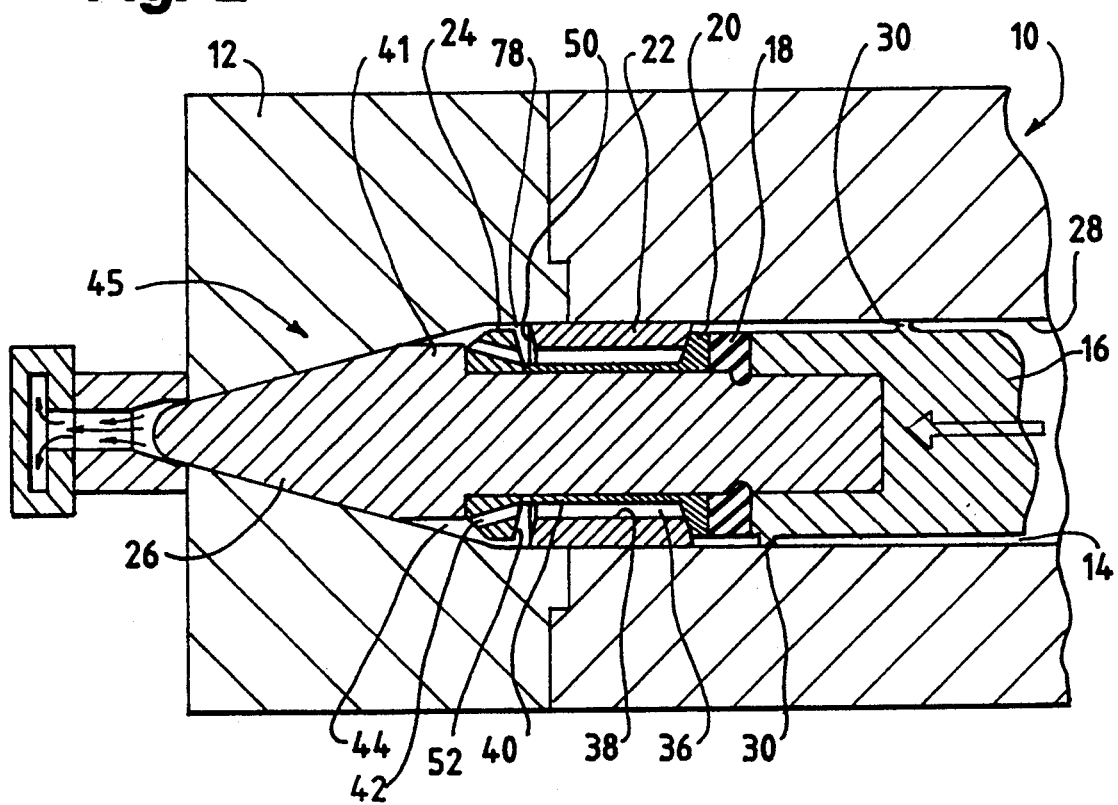
FIG. 2 is a cross-sectional view of the injector valve assembly according to the present invention, showing the center valve body member and screw in the injection position.

Referring now to FIG. 2, the valve assembly 10 is shown in the position corresponding to the injection phase of the injection sequence. This position is achieved by the axial motion of the valve assembly 10 within the housing 18 toward the left, the objective being the compression and pressurization of the molding material provided to the nozzle region of the valve assembly 10 during the priming phase of the injection sequence. The rear valve seat member 20 can be seen as being in abutting relation with the check ring 22 and the spacer 18. The interface of the rear valve seat member 20 and the check ring 22 is caused by the leftward translation of the valve assembly 10 in conjunction with the hydraulic pressure within the valve chamber 36, acting on the second annular end face 50 of the check ring 22, forcing the opposite first annular end face 48 against the rear valve seat 76 located on the annular projecting portion 74 of the rear valve seat member 20. These features may be also best seen in FIGS. 4 and 5. A tight seal is thus obtained to prevent reverse mass flow through the valve assembly 10 due to the extreme pressures generated during the injection phase.

As the pressures rise in the valve chamber 36, the material is extruded through the semi-annular orifices 42 and a supplemental annular orifice 78 created by the gap between the front valve seat 52 and the end 50 of the check ring into the annular nozzle chamber 44, and the nozzle passages 58. The molding material is thus directed through the tapered annular nozzle passage 58 into the runners 60 and the mold cavity 62 at extreme pressure until the leftward travel of the valve assembly is completed and presumably all voids in the mold have been filled with a uniform distribution of the molding material at a generally uniform pressure.

In accordance with an objective of this invention, it may be noted that assembly of the valve assembly 10 is relatively straightforward, as the front valve seat member 24 is provided with a center hub portion 64 having an inner circumference 66 which slidably engages the outer circumference 67 of the shaft portion 68 of the center valve body member 26. The reversible check ring 22 is then slid loosely, with either end face 48 or 50 going in first, over the shaft portion 68, after which the inner circumference 70 of the rear valve seat member 20 sleeve 72 is slidably engaged onto the shaft portion 68 until its distal end 80 abuts an annular surface 82 of the front valve seat member 24. The rear valve seat member 20 is also provided with an annular projecting portion 74, upon which the outer circumferential face 32 and rear valve seat 76 are located, that retains the check ring on the assembly. The center valve body member 26 is then threaded into the distal end of the screw member 16 to complete the assembly.

Note, in accordance with this invention, that the radial height of the face 82 of the hub portion 64 and the radial thickness of the sleeve 72 are preferably identical, as are the radial thickness of the head 41 and the radial height of the bearing surface 54 of the hub portion 64. The result is a smooth and uninterrupted lower radial edge defining a flow path through the semi-annular orifices 42. Although this arrangement may result in a slight incline of the semi-annular orifice 42 relative to the axis of the valve assembly 10, appropriate relative sizing of the head 41 diameter and sleeve 72 diameter can usefully maintain a substantially axial relationship.

From this description, it is apparent that if excessive wear is detected on the front valve seat 52, either end 48 or 50 of the check ring 22, and/or the rear valve seat 76, it is possible to readily and relatively inexpensively replace the offending component(s) without the need to replace the relatively expensive center valve body member 26. Further, if changes in the color or type of molding material is necessary, it is relatively convenient to clean the valve assembly components of the present invention of any deposits which may have accumulated. In addition to the fact that deposition is reduced over fluted or radially cut-out front valve seat members, the crevices of such configurations are eliminated by the smooth contours of the improved front valve seat member 24 of the present invention.

Finally, as the center valve body member 26 is always fabricated from 440C stainless steel, it can be appreciated that the upgrading of the valve assembly 10 to accommodate glass-filled or corrosive applications by the simple replacement of the valve seat members 20, 24 and/or the check ring 22 is economically feasible.

It will be understood that the details, materials and arrangements of parts of specific embodiments have been described and illustrated to explain the nature of the invention. Changes may be made by those skilled in the art without departing from the invention as expressed in the appended claims.

What is claimed is:

1. A ring valve for use with injection molding devices including a plurality of concentric members comprising:
    an axially translatable center valve body member adapted for translation between a first axial position and a second axial position, the center valve body member having a head portion of a first diameter and a shaft portion of a second, lesser diameter wherein the intersection of the head portion and the shaft portion defines a bearing surface;
    a replaceable front valve seat member defining a front valve seat disposed concentrically about the shaft portion of the center valve body member, the front valve seat member having a concentric center hub portion detachably coupled to the shaft and bearing surface of the center valve body member and having an annular outer front valve seat portion selectively sealing against a first end of a cylindrical outer check ring member; and
    a rear valve seat member defining a rear valve seat disposed concentrically about the axially translatable center valve body member, the rear valve seat member having a concentric center hub portion detachably coupled with the center valve body member shaft and the front valve seat member and having an annular outer rear valve seat portion selectively sealing against a second end of the cylindrical outer check ring member;
    the cylindrical outer check ring member being disposed concentrically about the shaft of the center valve body member for alternate sealing engagement with the front valve seat member and the rear valve seat member and being further disposed concentrically about the hub portion of the rear valve member;
    the ring valve, when the center valve body member is in the first axial position and the cylindrical outer ring is in sealing engagement with the front valve seat portion of the front valve seat member, providing substantially axial mass flow through a substantially annular opening and circumferentially about the head of the center valve member, the substantially annular opening defined between an annular first gap located between the outer check ring and the hub of the rear valve seat member and a substantially annular second gap located between the hub portion and the annular outer front valve seat portion of the front valve seat member.

2. The invention of claim 1, wherein the substantially annular opening further includes a continuous surface within each of the first and second annular gaps and transition therebetween and a continuous surface and transition therebetween from the substantially annular second gap and the head of the center valve body member.

3. The invention of claim 1, wherein the cylindrical outer check ring further defines an inner cylindrical surface and the hub portion of the rear valve seat member further defines a circumferential outer cylindrical surface, the inner surface of the cylindrical outer check ring and the outer surface of the hub portion of the rear valve seat member defining the annular first gap.

4. The invention of claim 1, wherein the annular outer front valve seat portion defines a circumferential inner cylindrical surface and the center hub portion defines a circumferential outer cylindrical surface, the inner surface of the annular outer front valve seat portion and the outer surface of the center hub portion defining the substantially annular second gap.

5. The invention of claim 4, wherein the second gap is further defined by a mass flow entrance and a mass flow exit, the mass flow entrance of the second gap being concentrically co-incident with the first gap and the outer surface of the hub portion proximate the mass flow exit being located at a radial position equal to the first diameter of the head portion.

6. The invention of claim 1, wherein the substantially annular opening throughout the valve is substantially parallel with an axis of the center valve body member.

7. The invention of claim 1, wherein the hub portion of the rear valve seat member extends toward the center hub portion of the front valve seat member and slidably retains the front valve seat adjacent the bearing surface of the center valve body member.

8. The invention of claim 4, wherein the outer annular outer front valve seat portion and the center hub portion are attached one to the other by a radially projecting streamlined web extending between the inner surface of the annular outer front valve seat portion and the outer surface of the center hub portion defining the substantially annular second gap.

* * * * *